United States Patent [19]

Monnot et al.

[11] Patent Number: 5,713,984
[45] Date of Patent: Feb. 3, 1998

[54] PROCESS FOR PRODUCING PRESSURIZED OXYGEN BY ADSORPTION

[75] Inventors: André Monnot, Le Perray en Yvelines; Marie Hélène Renaudin, Paris, both of France

[73] Assignee: L'Air Liquide, Societe Anonyme pour L'Etude et L'Exploitation des Procedes Georges Claude, Paris, France

[21] Appl. No.: 641,534

[22] Filed: May 1, 1996

[30] Foreign Application Priority Data

May 18, 1995 [FR] France .................................... 95 05924

[51] Int. Cl.⁶ ....................................... B01D 53/053
[52] U.S. Cl. ............................. 95/100; 95/103; 95/105; 95/130
[58] Field of Search .................. 95/96–98, 100, 95/103–105, 130

[56] References Cited

U.S. PATENT DOCUMENTS

| | | | |
|---|---|---|---|
| 3,430,418 | 3/1969 | Wagner | 95/100 |
| 3,564,816 | 2/1971 | Batta | 95/100 |
| 3,636,679 | 1/1972 | Batta | 95/100 |
| 3,738,087 | 6/1973 | McCombs | 95/98 |
| 4,194,891 | 3/1980 | Earls et al. | 95/98 |
| 4,194,892 | 3/1980 | Jones et al. | 95/130 X |
| 4,650,501 | 3/1987 | Hiscock et al. | 95/100 |
| 4,969,935 | 11/1990 | Hay | 95/98 |
| 5,015,272 | 5/1991 | Okada et al. | 95/100 X |
| 5,078,757 | 1/1992 | Rottner et al. | 95/98 |
| 5,114,441 | 5/1992 | Kanner et al. | 95/98 |
| 5,122,164 | 6/1992 | Hirooka et al. | 95/98 X |
| 5,223,004 | 6/1993 | Etéve et al. | 95/98 |
| 5,246,676 | 9/1993 | Hay | 95/98 X |
| 5,474,595 | 12/1995 | McCombs | 95/96 X |
| 5,531,807 | 7/1996 | McCombs | 95/96 X |
| 5,540,758 | 7/1996 | Agrawal et al. | 95/103 X |

FOREIGN PATENT DOCUMENTS

| | | |
|---|---|---|
| 0 354 259 | 2/1990 | European Pat. Off. . |
| 0 537 831 | 4/1993 | European Pat. Off. . |
| 2 612 082 | 9/1988 | France . |
| 2 647 431 | 11/1990 | France . |

Primary Examiner—Robert Spitzer
Attorney, Agent, or Firm—Young & Thompson

[57] ABSTRACT

The process comprises a regeneration phase including a co-current depressurization step, in order to participate in the repressurization of another adsorber, a countercurrent depressurization down to the low pressure of the cycle without gas intake, and then a countercurrent elution step at the low pressure of the cycle with oxygen taken off from production. The cycle time does not exceed 20 seconds. The process is particularly application to the production of oxygen having a purity greater than 90% with flow rates of 2 to 6 liters/minute for oxygenotherapy.

9 Claims, 2 Drawing Sheets

PROCESS FOR PRODUCING PRESSURIZED OXYGEN BY ADSORPTION

FIELD OF THE INVENTION

The present invention relates to processes for production of impure pressurized oxygen by adsorption in a plant comprising two adsorbers each undergoing, in the course of one cycle, the following steps:

a) recompression from atmospheric pressure, with cocurrent intake of compressed air and counter-current intake of gas coming from the other adsorber in phase c);

b) production with intake of compressed air and extraction of oxygen up to a high pressure of the cycle not less than $1.9 \times 10^5$ Pa;

c) cocurrent decompression by bringing into communication with the other adsorber in phase a); and d) regeneration with countercurrent depressurization down to atmospheric pressure and countercurrent elution with production oxygen.

BACKGROUND OF THE INVENTION

A process of this type, most particularly suitable for oxygenotherapy, is described in the document EP-A-0,176,393. In the process of this document, the elution takes place throughout the entire regeneration phase with oxygen taken off from production throughout the entire production phase, a diverted flow of oxygen being, for this purpose, permanently conveyed to the buffer volume via calibrated orifices. As will be seen later, the processes according to this document are suitable for supplying oxygen at a purity greater than 90% with oxygen flow rates not exceeding 3 liters/minute. However, there is a growing demand to be able to have available oxygen flow rates exceeding 3 liters/minute, or indeed 5 liters/minute, especially for incorporation into autonomous anaesthesia systems for field hospitals.

It would be possible to increase the oxygen concentration and/or the flow rate by adopting a so-called hybrid cycle with a high cycle pressure greater than atmospheric pressure and a low cycle pressure less than atmospheric pressure, as in most high-capacity industrial plants. However, these solutions result in considerable excess investment costs and running costs, especially because of the presence of an additional pump.

SUMMARY OF THE INVENTION

The object of the present invention is to provide improvements to the processes of the type mentioned hereinabove at the beginning, making it possible to improve the performance characteristics in terms of oxygen flow rates and purity without increasing either the overall size and investment or the electrical consumption by the apparatus.

In order to achieve this, according to one characteristic of the invention, the first part of step d) is a pure countercurrent depressurization without intake of gas, the elution taking place only at the end of this phase d), typically for a duration not exceeding half that of phase d).

According to other characteristics of the invention:

the total duration of one cycle does not exceed 20 seconds;

the elution takes place at atmospheric pressure and its duration is less than half the duration of step d).

BRIEF DESCRIPTION OF THE DRAWINGS

Other characteristics and advantages of the present invention will emerge from the following description of one embodiment, given by way of illustration but implying no limitation, with reference to the appended drawings in which.

DETAILED DESCRIPTION OF THE DRAWINGS

Figure 1:
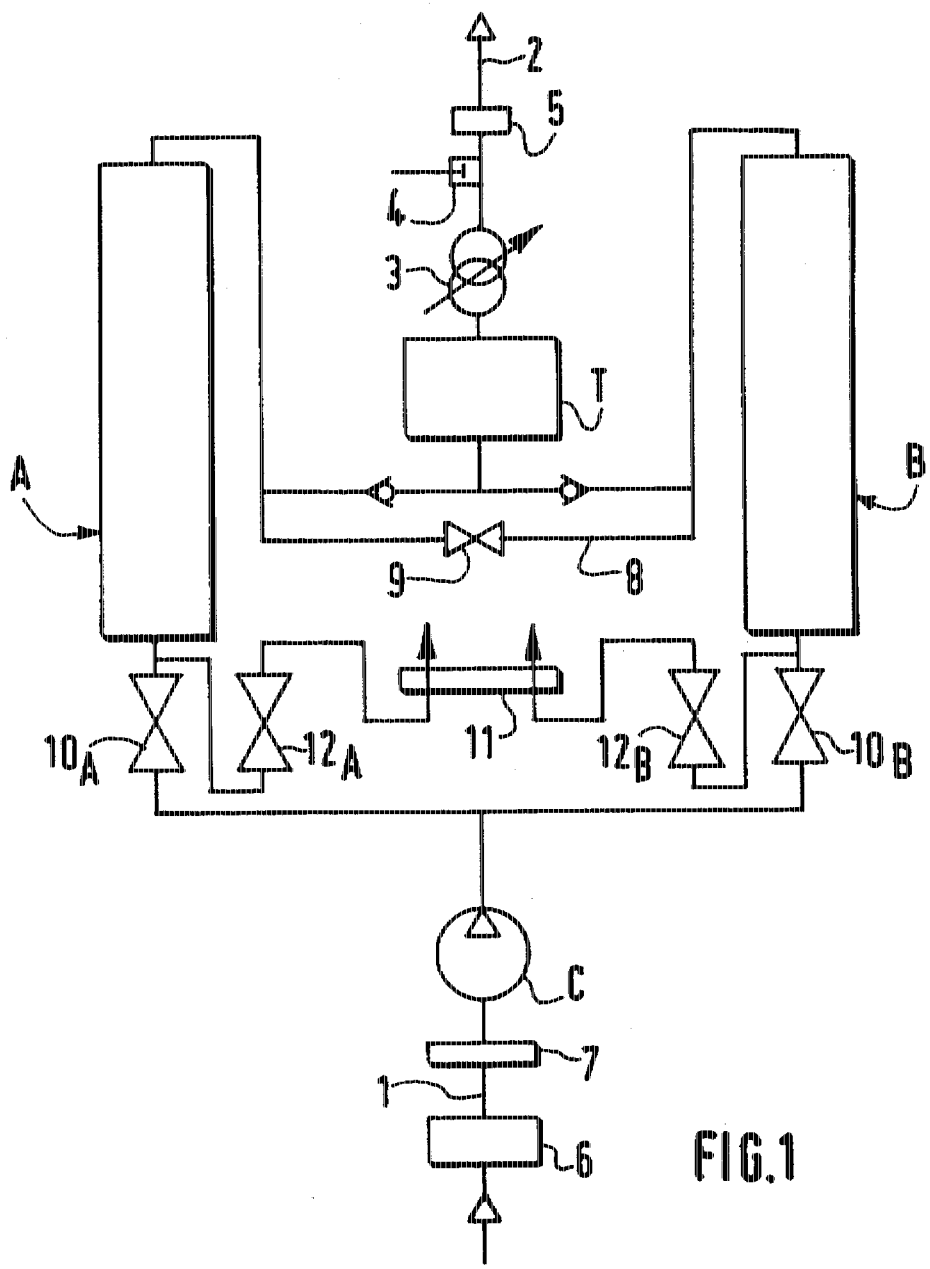
FIG. 1 is a diagrammatic view of a plant for implementing a process according to the invention.

The plant for production of impure oxygen, also called a concentrator, shown in FIG. 1, comprises two adsorbers A and B which are filled with a molecular sieve and interposed between a line 1 for supplying air compressed by a compressor C and a production line 2 intended to be connected to a user station and comprising, in series, a buffer volume T, a pressure regulator 3 and an overpressure valve 4 guaranteeing that the pressure at the user station does not exceed a defined level of approximately $1.5 \times 10^5$ Pa. Typically, the production line 2 includes, on the outlet side, a bacteriological filter 5, the inlet line 1 including, in succession, a silent filter 6 and a bacteriological filter 7.

The outlets of the adsorbers A and B communicate directly with the volume T and selectively with each other via a coupling or balancing line 8 provided with a two-way solenoid valve 9. The inlets of the adsorbers A and B communicate with the inlet line 1 via inlet solenoid valves 10A and 10B, respectively, and with a vent to atmosphere provided with an exhaust silencer 11 via solenoid valves 12A and 12B, respectively.

Figure 2:
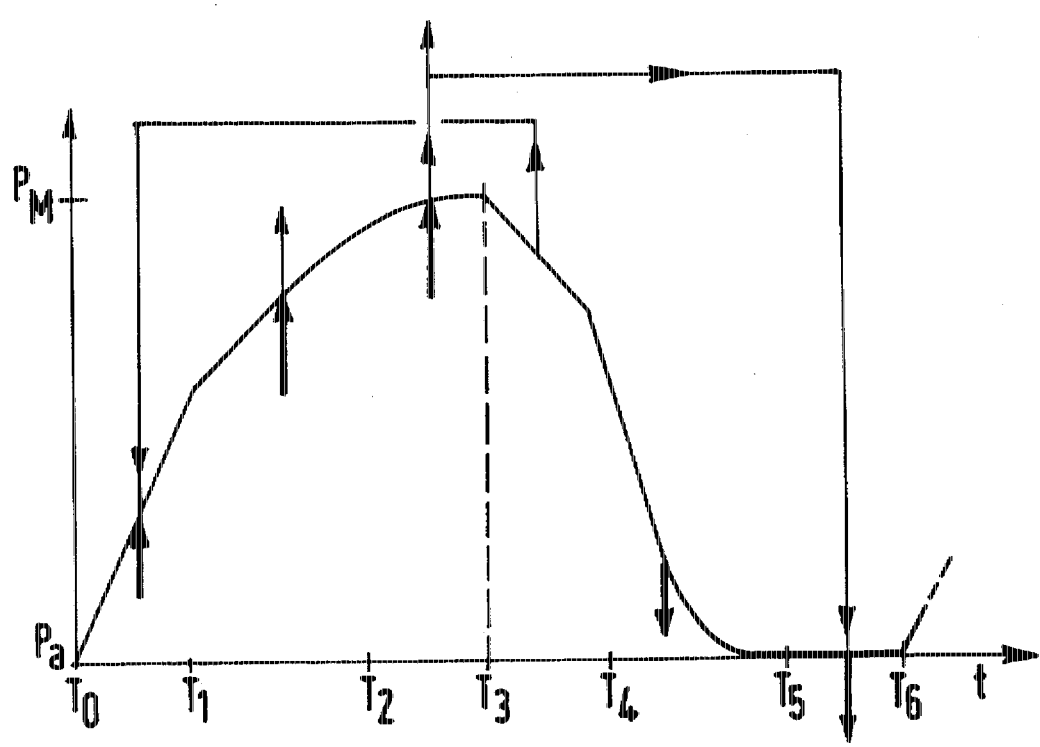
FIG. 2 is a diagrammatic view of one cycle in accordance with the process according to the invention.

One cycle according to the invention will now be described with reference to FIG. 2. Starting from the low pressure $P_a$ of the cycle, which is atmospheric pressure, the valves 10A/B and 9 being open, each adsorber undergoes a first pressurization (step $T_0$–$T_1$) with intake of compressed air in the production direction (called hereinbelow cocurrent direction) and, as countercurrent, with pressurized gas enriched with oxygen coming from the outlet of an adsorber which has completed its production phase (step $T_3$–$T_4$, as will be seen later). Above an intermediate pressure, of about 1.5 to $2 \times 10^5$ Pa, and up to the high pressure of the cycle, typically 2.8 to $3.3 \times 10^5$ Pa, advantageously approximately $3.0 \times 10^5$ Pa, the valve 9 is closed and the adsorber operates in production phase (steps $T_1$–$T_3$) with intake of compressed air at the inlet and extraction of oxygen on the outlet side. At the end of the production phase (step $T_2$–$T_3$), some of the oxygen produced is fed as a countercurrent to an adsorber which has completed its decompression (elution step $T_5$–$T_6$ with valves 9 and 12A/B open, as will be seen later on).

At the end of the production phase, at time $T_3$, the inlet valve (10A/B) is closed and, the valve 9 being open, the adsorber undergoes a cocurrent first depressurization (step $T_3$–$T_4$), the gas evacuated participating, as was seen above, in the repressurization of the other adsorber (steps $T_0$–$T_1$). At time $T_4$, the valve 9 is closed and the exhaust valve 12A/12B is opened, the adsorber thus undergoing countercurrent depressurization until reaching the low pressure of the cycle, $P_a$. At this level, as mentioned above, the adsorber undergoes countercurrent elution with production gas, the exhaust valve 12A/12B remaining open and the valve 9 also being open. At time $T_6$, corresponding to time $T_0$ described previously, the adsorber recommences a new, identical cycle.

Typically, the duration of one cycle of a process according to the invention, for oxygenotherapy application, does not exceed 20 seconds and is typically between 16 and 19 seconds. Within one such cycle, steps $T_1$–$T_2$ or $T_4$–$T_5$ have a duration greater than half a half-cycle, i.e. typically between 5 and 5.5 seconds. Steps $T_2-T_3$ or $T_5-T_6$ have a duration slightly greater than that of steps $T_0-T_1$ or $T_3-T_4$, i.e. typically approximately 2 seconds.

Table 1 below shows a comparison between a cycle according to the abovementioned document and a cycle according to the invention, under the following conditions:

$P_M$: $3 \times 10^5$ Pa cycle time:

prior art: 28 seconds invention: 16.4 seconds duration of the steps:

prior art:

$T_0-T_1$ and $T_3-T_4$: 2 seconds;

$T_1-T_3$ and $T_4-T_6$: 12 seconds;

invention:

$T_0-T_1$ and $T_3-T_4$: 1.2 seconds; and $T_1-T_2$ and $T_4-T_5$: 5 seconds;

$T_2-T_3$ and $T_5-T_6$: 2 seconds;

all the other parameters (temperature, dimensions and adsorbents) being, moreover, identical.

TABLE 1

| Flow rate in litres/min. | $O_2$ Content, %, prior art | $O_2$ Content, %, invention |
| --- | --- | --- |
| 2 | 95 | 95 |
| 4 | 91.3 | 95 |
| 5 | 83.8 | 95 |
| 5.5 | 81 | 93.5 |
| 6 | 76.3 | 89 |

As may be seen, the process according to the invention makes it possible to guarantee a high level of oxygen content over a wide range of flow rates up to 5.5 liters/minute, the oxygen content remaining substantially greater than 90% up to flow rates of about 6 liters/minute.

Although the present invention has been described with reference to particular embodiments, it is open to modifications and to alternative forms which will be apparent to one skilled in the art within the scope of the claims hereinbelow.

We claim:

1. A process for producing oxygen by adsorption from air in a plant comprising two adsorbers wherein each adsorber undergoes, in the course of one cycle, only the following four sequential steps:

a) recompression, from atmospheric pressure ($P_a$) to an intermediate pressure, with simultaneous co-current intake of compressed air and countercurrent intake of gas coming from the other adsorber in phase c);

b) production, with simultaneous intake of compressed air and extraction of oxygen, from the intermediate pressure to a high pressure of the cycle ($P_m$) not less than $1.9 \times 10^5$ Pa;

c) co-current depressurization, by establishing communication with the other adsorber in phase a);

d) regeneration, with countercurrent depressurization down to atmospheric pressure ($P_a$) and subsequent countercurrent elution with production oxygen, wherein the first part of step d) is a pure countercurrent depressurization without intake of gas, the elution taking place only at the end of step d).

2. Process according to 1, wherein the elution takes place at atmospheric pressure ($P_a$) and its duration is less than half that of step d).

3. The process of claim 2, wherein step c) is a pure co-current depressurization towards the other adsorber, without any discharge of product gas no co-current intake of gas.

4. Process according to 1, wherein the duration of one cycle does not exceed 20 seconds.

5. Process according to claim 4, wherein the production flow rate is between 2 and 6 liters/minute approximately.

6. Process according to claim 4, wherein the duration of steps a) and c) does not exceed 3 seconds.

7. Process according to claim 1, further including the step of depressurizing the oxygen produced down to a pressure not exceeding $1.5 \times 10^5$ Pa for supply to a user station.

8. Process according to claim 1, further comprising the step of passing supply air through a bacterial filter.

9. Process according to claim 1, further comprising the step of passing the oxygen produced through a bacterial filter.

* * * * *